Figure 1:
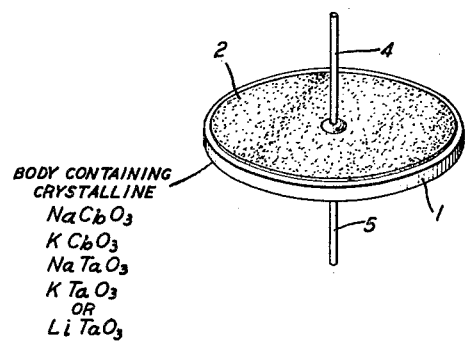

June 3, 1952  B. T. MATTHIAS  2,598,707
ELECTRICAL DEVICE EMBODYING FERROELECTRIC SUBSTANCE
Filed Oct. 20, 1949

BODY CONTAINING CRYSTALLINE
$NaCbO_3$
$KCbO_3$
$NaTaO_3$
$KTaO_3$
OR
$LiTaO_3$

INVENTOR
B. T. MATTHIAS
BY Edwin B. Cave
ATTORNEY

Patented June 3, 1952

2,598,707

UNITED STATES PATENT OFFICE 2,598,707

ELECTRICAL DEVICE EMBODYING FERRO-ELECTRIC SUBSTANCE

Bernd T. Matthias, Summit, N. J., assignor to Bell Telephone Laboratories, Incorporated, New York, N. Y., a corporation of New York Application October 20, 1949, Serial No. 122,373

11 Claims. (Cl. 171—327)

This invention relates to new ferroelectric bodies and to electrical devices utilizing these bodies. This application is a continuation-in-part of B. T. Matthias application Serial No. 86,176 filed April 8, 1949.

The invention is based upon the discovery of ferroelectric properties in crystals of sodium columbate ($NaCbO_3$), potassium columbate ($KCbO_3$), sodium tantalate ($NaTaO_3$), potassium tantalate ($KTaO_3$) and lithium tantalate ($LiTaO_3$).

Ferroelectricity is a phenomenon associated with the spontaneous polarization of groups of ionic dipoles in the crystal lattice so as to form electrically polarized domains. These domains usually tend to be so arranged within the crystal as substantially to neutralize each other and present no substantial external electric field.

Application of an electric field to such a crystal, or a body of such crystals, causes growth of those domains having their direction of polarization most nearly aligned with the direction of the applied field, at the expense of the other domains, and also causes some orientation, toward the direction of the field, of the direction of polarization within the domains that remain. The result is an over-all polarization of the crystal, or body of crystals, to which the field is applied. Removal of the applied field results in partial retention of a residual over-all polarization and partial restoration of domains having components of polarization in the reverse direction.

These ferroelectric properties in the sodium metacolumbate, potassium metacolumbate, sodium metatantalate and potassium metatantalate crystals referred to above appear to be associated with the pseudo-cubic or perovskite crystalline structure possessed by these substances at room temperature. Above a definite temperature a transition of crystalline structure, from pseudo-cubic or mimetic to cubic occurs and this temperature may be taken as the Curie point for these substances since the ferroelectric effects disappear at higher temperatures.

Lithium tantalate differs from the sodium and potassium columbates and tantalates in that it crystallizes in the rhombohedral and not the cubic system. The crystals of lithium tantalate are nevertheless strongly ferroelectric.

The Curie temperatures may vary considerably with small amounts of impurities in the crystals. Measurements which have been made on crystals of substantial purity have indicated Curie temperatures roughly as follows:

Sodium columbate, 425° C.
Potassium columbate, 325° C.
Sodium tantalate, 475° C.
Potassium tantalate, 200° C. to below room temperature depending on method of preparation
Lithium tantalate, 550° C.

Figure 2:
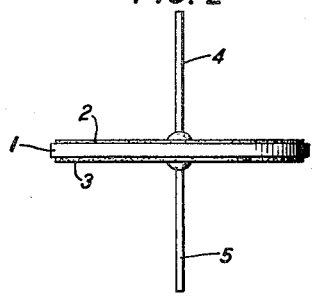

The ferroelectric characteristics of these substances render them adaptable to a number of practical applications. Among these may be mentioned their use as condenser dielectrics and as piezoelectric elements. For these purposes, the sodium and potassium columbates and tantalates and the lithium tantalate may be used in the form of single crystals or in the form of polycrystalline ceramics as will be discussed below. Referring to the accompanying drawing:

Fig. 1 is a perspective view of an electrical device which is useful as a condenser or as a piezoelectric element and which embodies the ferroelectric substances of the present invention; and Fig. 2 is a front elevation, in section, of the device of Fig. 1.

In the device shown in Figs. 1 and 2, the novel ferroelectric body of the present invention is shown in the shape of a thin circular disc 1. Adherent metal coatings 2 and 3 formed on the opposite sides of the disc serve as a pair of electrodes. Lead wires 4 and 5 are electrically connected to the electrodes 2 and 3 by suitable means, as by soldering.

The device shown in Figs. 1 and 2 may serve, when properly utilized, as an electric condenser or as a piezoelectric device. When used as an electric condenser, the device makes use of the extremely high dielectric constant which is exhibited by ferroelectric substances by reason of their high reversible polarizability.

This high dielectric constant of the sodium and potassium columbates and tantalates increases with increasing temperature in the vicinity of the Curie point, reaching a maximum at the Curie temperature and falling off rapidly at higher temperatures. Values obtained for the dielectric constants of the sodium and potassium columbates and tantalates by measurements on single crystals are roughly as follows:

|  | Dielectric Constant at Room Temperature (25° C.) | Dielectric Constant at Curie Temperature |
|---|---|---|
| Sodium columbate | 400 | 7,000 |
| Potassium columbate | 250 | 3,800 |
| Sodium tantalate | 220 | 3,000 at 400°C. (not measurable at Curie point). |
| Potassium tantalate | 200 to 400 | 1,000 to 20,000 |

In the table above, the value of the dielectric constant of sodium tantalate at the Curie point was not measurable since at that temperature (about 475° C.) the conductivity became so high as to render the dielectric constant measurements unreliable.

Lithium tantalate reaches electrical saturation at such high values of potential gradient that the ultimate saturation value of the dielectric constant is measured with difficulty. At room temperature, the dielectric constant increases from a value of about 35 when measured at a potential gradient of about 10 volts per centimeter up to a value which may be estimated as several thousand at the saturation gradient, which is in excess of 20,000 volts per centimeter.

Since the coercive force of the lithium tantalate, which is about 10,000 volts per centimeter at room temperature, increases more rapidly with increasing temperature than does the spontaneous polarization, the dielectric constant of lithium tantalate, unlike that of the other substances referred to above, decreases with increasing temperature below the Curie temperature when measured at moderate potential gradients.

Since the dielectric constant is decreased by a direct-current bias across the dielectric, the device of Figs. 1 and 2, when used as a condenser, is preferably operated without an externally applied direct-current bias and without a residual polarization resulting from prior exposure of the dielectric to a higher potential gradient than that under which it is intended to operate.

When the device shown in Figs. 1 and 2 is used as a piezoelectric element, it is operated while subjected to a constant direct-current biasing field. When subjected to such a field, the body 1 exhibits piezoelecric properties in that it changes in physical size in response to changes of a potential applied across the body in a direction having a component parallel to the direction of the biasing field, and in that, when subjected to mechanical stress, it generates a potential, in the direction of the biasing field, which varies with variations in the applied stress. The effectiveness of the piezoelectric element increases as the superimposed direct-current field is increased.

The direct-current biasing field for piezoelectric use may be established by maintaining a direct-current voltage across the electrodes 2 and 3 while the device is in use. A similar result can be achieved by subjecting the ferroelectric body to a high direct-current potential gradient for a substantial period of time prior to use. Upon removal of this direct-current potential, a residual polarization remains in the body which can be used as the source of the requisite direct-current field without the use of an externally applied direct-current potential. A particular permanent polarizaiton can be induced in lithium tantalate because of its high coercive force. The residual polarization may be obtained more effectively with the sodium and potassium columbates and tantalates if the body is heated to a temperature above the Curie temperature and is then allowed to cool to room temperature under a high direct-current potential gradient.

A substantial residual polarization may be established on the body at room temperature by the application of a potential gradient of between about 20,000 volts per centimeter or higher and about 5,000 volts per centimeter for a minimum period of time falling between about a few minutes at the high voltage and 1 to 3 hours at the lower voltage. Similar potential gradients may be used where the body is polarized by cooling it from above the Curie point while the potential is applied. With the latter polarization procedure the time for which the potential is applied is not important.

The device of Figs. 1 and 2, when operated with an adequate direct-current bias either externally applied or resulting from remnant polarization in the body 1, may be used for any of the known piezoelectric purposes. Thus, it may be used in the usual manner as a frequency control device or as an electromechanical filter, the alternating-current voltage being applied across the leads 4 and 5 and the external direct-current biasing voltage, if any, being applied across the same leads. A suitable externally applied direct-current biasing gradient may be between about 1,000 volts per centimeter and 20,000 volts per centimeter.

The device may also be used in the usual manner as an electromechanical transducer where it is desired to convert variations of electrical current or potential into corresponding mechanical variations, or vice versa, as in supersonic sound generators, microphones, telephone receivers, phonograph pick-ups, piezoelectric relays and similar devices. In such devices, the usual mechanical means are supplied for either transmitting mechanical energy to the body 1, as in microphones and phonograph pick-ups, or utilizing the mechanical energy generated in the body, as in supersonic generators, telephone receivers and relays.

As mentioned above, the body 1 of Figs. 1 and 2 may be formed of the ferroelectric substance in the form of a single crystal or crystal section or in the form of a coherent polycrystalline body, such as a ceramic body prepared by sintering together finely divided particles of the ferroelectric crystals.

One method by which crystals of the ferroelectric substances of the present invention have been prepared is by reacting lithium carbonate, sodium carbonate or potassium carbonate with columbium pentoxide or tantalum pentoxide in the molten state in a flux such as sodium fluoride, potassium fluoride, or lithium fluoride, cooling the mass to room temperature and dissolving away the flux with water, so as to leave the substantially insoluble ferroelectric crystals.

Thus, crystals of sodium metacolumbate were grown by mixing stoichiometric quantities of sodium carbonate and columbium pentoxide with about 10 per cent by weight of sodium fluoride as a flux, heating the mixture to 1400° C. and then cooling it to room temperature over a period of about 2 hours. Crystals of sodium metatantalate were grown by a similar procedure except for the substitution of tantalum pentoxide for columbium pentoxide.

Similarly, crystals of potassium metacolumbate were grown by making mixtures of equal amounts of potassium carbonate, columbium pentoxide and potassium fluoride, heating for about 6 hours at 1170° C. cooling at a rate of about 10° C. per hour until the mass has cooled to about 700° C. and then cooling rapidly to room temperature. Crystals of potassium metatantalate were grown in a similar manner with the substitution of tantalum pentoxide for columbium pentoxide.

Crystals of potassium metacolumbate and potasium metatantalate were also grown by mixing stoichiometric amounts of potassium carbonate and either columbium pentoxide or tantalum pentoxide with an equal weight of a flux consisting of about four parts of potassium fluoride and one part of sodium fluoride, heating at about 1200° C. for about 3 hours and then cooling to room temperature at a rate in the vicinity of about 100° C. per hour.

Crystals were also prepared by reacting at 1200° C. a mixture having the weight proportion of one part of potassium fluoride, 2.6 parts of potassium sulfate, 1.55 parts of potassium carbonate and three parts of columbium pentoxide, cooling to about 700° C. at a rate of about 15° C. per hour and then cooling rapidly to room temperature. Potassium metatantalate crystals were prepared similarly except for the substitution of 5.4 parts by weight of tantalum pentoxide for the columbium pentoxide.

Crystals of lithium tantalate were prepared by aquimolar quantities of lithium carbonate and tantalum pentoxide at 1300° C. together with a large excess (40 mols) of lithium fluoride as a flux for 2 hours and then cooling to room temperature over a period of several hours.

The crystals of sodium metacolumbate prepared as described above had an average size in the vicinity of 2 millimeters. Crystals of the other substances had average sizes approximating one-half millimeter or one millimeter.

Ceramic bodies may be prepared by grinding the crystals of ferroelectric substances, prepared as above, to a finely divided state, mixing the finely divided substance with a small amount of a temporary binder, pressing the mixture into the desired shape, and firing the pressed body at a temperature sufficient to volatilize any binder present and to sinter the particles so as to form a compact ceramic mass. Any suitable temporary binder may be used such as water or a wax, such as "Halowax" (chlorinated naphthalene), or a heat depolymerizable resin, such as polymethyl methacrylate. The wax or resin may be added to the finely divided crystalline substance in the form of a solution in a volatile organic solvent, which is subsequently allowed to evaporate leaving the binder in the mass. From about 3 per cent to about 6 per cent of the binder, based on the weight of the remainder of the mass, is ordinarily adequate.

The mixture of the finely divided ferroelectric substance and the binder is preferably pressed into shape at a high pressure, of the order of several tons per square inch. In the absence of any substantial amount of a flux, the firing of the pressed body may be carried out at from about 1300° C. to about 1500° C. for from 1 to 2 hours or more. Preferably, a small amount, up to about 5 per cent, of a flux or a mineralizer, such as finely divided boric oxide, borax, magnesium chloride or calcium chloride, is incorporated in the mixture before pressing and the firing is carried out at a slightly lower temperature.

The crystals of sodium and potassium columbates and tantalates entering into the devices of the present invention, whether they are used in the form of monocrystalline bodies or polycrystalline bodies, have been described above as prepared from a single compound. It is often desirable to form these crystals of a mixture of two or more of these substances, both substances entering into the same crystal lattice. Similarly, it may also be desirable to form the crystals of a mixture of one or more of the above substances with one or more of some other ferroelectric substance capable of entering into the same crystal lattice, such as lanthanum gallate, lanthanum aluminate, or barium titanate. The ferroelectric crystals produced in this manner will usually have Curie temperatures lying between the Curie temperatures of crystals of the single components.

It may also be desirable to form mixed crystals in which a small amount of lanthanum ferrate or of other rare earth metal ferrates is present for the purpose of lowering the Curie point. Because of the high conductivity of the ferrates, the amount added should ordinarily be limited to not more than about 10 per cent of the total substance entering into the crystal. It may also be desirable to form mixed crystals with lead titanate or any other substance having the perovskite structure. If the added substances are not themselves ferroelectric, or have ferroelectric properties only at temperatures so far below or above room temperature as to be non-ferroelectric for practical purposes, it is desirable that the amount added be limited to not more than about 10 per cent by weight so as not to dilute the ferroelectric effect of the body unduly.

Lithium tantalate, which crystallizes in the rhombohedral system, does not form mixed crystals with these other ferroelectric substances which possess the perovskite crystalline structure. It may under some circumstances, however, be found desirable to form mixed crystals of lithium tantalate with another substance, such as lithium columbate, which has a similar crystalline structure.

These mixed crystals may be formed in the same manner as described above, except that stoichiometeric amounts of the oxide components of the compounds to be added are incorporated in the melt along with the original components. In the preparation of polycrystalline bodies, in place of forming crystals of several components, it may sometimes be desirable to prepare the bodies from a mixture of finely divided ferroelectric crystals of more than one substance, each individual crystal particle being formed of a single compound.

The devices of the present invention have been described as made up essentially of a pair of electrodes spaced by a coherent body of one or more ferroelectric crystals containing lithium tantalate or sodium or potassium columbate or tantalate. These devices may be manufactured according to the techniques known in the art for the manufacture of analogous devices embodying other ferroelectric crystal bodies. The best results are obtained when the electrodes consist of an adherent conductive coating formed directly on the ferroelectric body, as by the application of a conventional silver paste, which is later fired to produce an adherent durable solid conductive coating, or by applying a sprayed or evaporated metal layer.

It may obviously be desirable to form the devices of the present invention with more than two electrodes in some instances. When the ferroelectric body is in a polycrystalline substance, it may obviously be readily formed into various shapes other than those shown in the drawings. Thus, it may be formed in the shape of a tube having an internal metal coating and an external metal coating as electrodes or it may be formed as an annular ring having suitably disposed electrodes.

The invention has been described above in terms of its specific embodiment and, since modifications and equivalents will be apparent to those skilled in the art, the description is intended to be illustrative of, and not a limitation upon, the scope of the invention.

What is claimed is:

1. A ferroelectric body comprising a ceramic of sintered finely divided crystal particles, said crystal particles containing at least one substance selected from the group consisting of sodium metacolumbate, potassium metacolumbate, sodium metatantalate, potassium metatantalate and lithium metatantalate.

2. An electric device comprising at least two conducting electrodes spaced by a ferroelectric body comprising a ferroelectric crystalline material containing at least one substance selected from the group consisting of sodium metacolumbate, potassium metacolumbate, sodium metatantalate, potassium metatantalate and lithium metatantalate.

3. An electric device comprising at least two conducting electrodes spaced by a ferroelectric body comprising a ceramic of sintered finely divided crystal particles, said crystal particles containing at least one substance selected from the group consisting of sodium metacolumbate, potassium metacolumbate, sodium metatantalate, potassium metatantalate and lithium metatantalate.

4. An electric device comprising a ferroelectric body comprising a ferroelectric crystalline material consisting of at least one substance selected from the group consisting of sodium metacolumbate, potassium metacolumbate, sodium metatantalate, potassium metatantalate and lithium metatantalate, and a pair of conducting electrodes in the form of an adherent metallic coating formed on said body.

5. An electric condenser comprising a pair of conductive electrodes spaced by a ferroelectric body comprising a ceramic of sintered finely divided crystal particles of a substance selected from the group consisting of sodium metacolumbate, potassium metacolumbate, sodium metatantalate, potassium metatantalate and lithium metatantalate.

6. A piezoelectric device comprising a pair of conducting electrodes spaced by a ferroelectric body comprising a ceramic of sintered finely divided crystal particles consisting of a substance selected from the group consisting of sodium metacolumbate, potassium metacolumbate, sodium metatantalate, potassium metatantalate and lithium metatantalate, said body having a substantial permanent over-all electrical polarization.

7. A device as defined in claim 4 wherein the ferroelectric material consists of sodium metacolumbate.

8. A device as defined in claim 4 wherein the ferroelectric material consists of potassium metacolumbate.

9. A device as defined in claim 4 wherein the ferroelectric material consists of sodium metatantalate.

10. A device as defined in claim 4 wherein the ferroelectric material consists of potassium metatantalate.

11. A device as defined in claim 4 wherein the ferroelectric material consists of lithium metatantalate.

BERND T. MATTHIAS.

REFERENCES CITED

The following references are of record in the file of this patent:

UNITED STATES PATENTS

| Number | Name | Date |
|---|---|---|
| 2,486,560 | Gray | Nov. 1, 1949 |

OTHER REFERENCES

J. W. Mellor, Comprehensive Treatise on Inorganic and Theoretical Chemistry, vol. 9, pages 863, 901.